Patented Feb. 15, 1944

2,341,885

UNITED STATES PATENT OFFICE 2,341,885

PROCESS FOR COATING PLASTIC MATERIALS AND THE PRODUCT PRODUCED

Frank J. Sowa, Cranford, N. J.

No Drawing. Application June 10, 1941,
Serial No. 397,368

9 Claims. (Cl. 117—26)

This invention relates, in general, to coated materials and in particular to a process for coating sheet materials and to correlated improvements designed to enhance the properties and uses of such coated materials.

The invention has particular reference to coating materials comprising non-fibrous plastic materials which are characterized by having a smooth glossy surface and which afford little anchorage for the usual coating compositions. Surface coatings are usually applied to such plastic materials for the purpose, inter alia, of protecting printing applied thereto, to modify the surface, reduce the gloss, decrease the slipperiness, and to impart a proper slip, and finally to render the material moistureproof, stainproof and washable. Therefore, the coating must frequently be not only transparent but also non-tacky, moistureproof, water-proof and free of abjectionable surface gloss. It has been found that when such a coating composition is applied to the smooth, glossy surface of the non-fibrous materials the coating frequently adheres imperfectly to the base material so that the coating tends to crack, peel or separate from the base when the coated material is bent, moistened or otherwise handled. However, this adhesion must be obtained without the development of brittleness which results from ordinary chamical methods of using in the coating a solvent which will dissolve the surface layers of the base material.

Therefore, it is a general object of the present invention to improve the adhesion of the coating to non-fibrous plastic materials without changing the physical strength of the plastic.

It is a specific object to provide a method of coating smooth surfaced plastic materials in a simple and economical manner with a strongly adherent coating.

It is a further specific object to provide a plastic material with a transparent, non-tacky, non-slippery, washable coating thereon which adheres firmly to the base during use and washing.

Objects of the invention will be in part obvious and will in part appear hereinafter.

According to the present invention, non-fibrous plastic materials are provided with strongly adhering coatings of the type just described by applying to the surface of the uncoated plastic base, preferably after printing the base, a multiplicity of particles of a comminuted material which exhibits a chemical adsorption to the base and of such particle size and in such an amount that the particles do not detract from the appearance of the coated material, and thereafter applying a coating of a film-forming composition over the surface of the plastic material carrying such particles, whereby the particles improve greatly the adhesion of the coating to the plastic base.

The comminuted material employed consists of particles of a compound of an element capable of forming molecular coordination complexes by reason of covalency or residual valence, the particles being small enough to enable the compound to form coordination complexes with the molecules in the surface of the plastic base, whereby the surface coating is anchored to the base by reason of the covalences or residual valences exercised by said metal compounds for the plastic base on the one hand and for the coating on the other.

The classes of elements which are capable of forming molecular coordination complexes are those elements which exhibit residual valences according to the Werner theory. Of this class the compounds employed in the present invention comprise all of the anhydrous solid compounds of metals, preferably amphoteric metals, which have a tendency to form coordination complexes according to Werner's Theory. Since this entire class of compounds is capable of use in this invention, the following examples are given merely by way of illustrating but not by way of limiting the invention: The solid salts and solid oxides of copper, magnesium, aluminium, silicon, zinc, tin, vanadium, chromium, molybdenum, manganese, iron, cobalt, nickel and the like. Because of the low molecular weight and the high tendency of magnesium to form coordination complexes, I prefer to employ anhydrous solid compounds of magnesium, in particular magnesium silicate, magnesium fluoride, magnesium oxide, magnesium carbonate, magnesium chloride, magnesium sulfate. Other examples of compounds which are useful as the comminuted material, are anhydrous stannic chloride, powdered clay, bentonite, talc, soapstone and the like.

The compound selected should be preferably colorless, white or of a light shade when powdered and the material should be inert in the solvents used in the film-forming composition. Generally speaking, the finer the particle size, the less material is required, the less alteration in transparency and the better the adhesion. The particles should have a size of less than 80 mesh and preferably less than 100 mesh of which 50% should pass a 200 mesh screen. For each compound there appears to be a threshold value for the particle size below which the covalences and residual valences are most effective in anchoring the particles to the surface. The amount of comminuted material to be employed to produce proper adhesion is extremely small, since improved adhesion of the coating is obtained with an amount of powder deposited on the surface which is invisible to the naked eye.

The process of the invention is applicable for coating the entire class of non-fibrous plastic materials whether inorganic or organic, and the following examples are given merely by way of illustrating but not by way of limiting the present invention: metals of all kinds, glass of all kinds, and organic plastic materials of all kinds such, for example, as cellulose derivatives, esters of cellulose as a class, cellulose ethers as a class, also synthetic resins as a class, including for example, vinyl resins, copolymers of vinyl compounds, methyl methacrylate resins, urea-formaldehyde resins, glyptal resins, and mixtures of cellulose derivatives and resins. To the organic plastic materials there is usually added suitable plasticizers, drying oils, fillers, pigments, waxes and other ingredients depending upon the nature of the plastic and the type of product desired. The plastic materials may be in the form of tubes, sheets, films, filaments, plates, molded objects and articles formed in whole of or coated with the non-fibrous plastic material.

The plastic materials may be printed, embossed or otherwise decorated with necessary characters, designs, figures and other indicia in a suitable manner, for example, by a photo-offset process, a letter-press process, or by rotogravure or other conventional printing process, which processes, per se, also form no part of the present invention.

After any such printing, embossing or decorating operation, in the process of the present invention, the printed base is treated to deposit on one or both surfaces an invisible deposit comprising a multiplicity of fine particles of comminuted material.

The comminuted material may be applied to the base in any suitable manner as by dusting or spraying the solid particles on the plastic base or by treating the base with a suspension or solution of the particles in a liquid inert to both particles and plastic base, such as water, alcohol, benzene and the like depending upon the nature of the materials, and thereafter evaporating the liquid to leave the particles on the plastic base.

The dry plastic base carrying the particles on the surface is next coated with the film-forming composition such, for example, as a solution in a suitable organic solvent of cellulose derivatives as a class including cellulose esters, cellulose ethers, cellulose ester-ethers, or synthetic resins, drying oils or drying-oil-modified resins or mixtures of these film-forming ingredients, to which composition may be added the usual plasticizers, gums, fillers and the like, and moistureproofing agents such as wax. The compositon may be applied in any suitable manner but is preferably applied by spraying, in a plurality of coatings, which upon evaporation of the solvent leaves a transparent, non-tacky, non-slippery protective coating.

Without limiting the invention by any theoretical explanation, it now appears that the particles of comminuted material are attracted to the surface of the non-fibrous plastic material by physico-chemical surface forces which may be electrical (static charges) and that the film produced by the coating operation is attracted to the particles by similar forces so that the particles may be considered as forming a multiplicity of separate anchors to hold the coating to the base sheets. That the particles serve to increase the adhesion to the plastic material is surprising and unexpected in view of the conventional practice in the lacquering art of always avoiding the application of a lacquer to a dusty surface and the usual admonitions of lacquer manufacture that the surface to be coated should be clean and free of grit. Accordingly, the present invention achieves new and commercially valuable results by proceeding contrary to the teachings of the prior art.

By way of more specific illustration but not by way of limiting the invention, there will be given the following specific example: A sheet formed of plasticized cellulose acetate is first printed and then dusted on both sides with magnesium carbonate having a particle size of between 100 and 200 mesh, the amount of powder applied to the base being less than that amount which will form a visible deposit. Both sides of the base sheet carrying the particles are coated three times each by spraying with a nitrocellulose lacquer comprising a plasticizer and a wax. The coating adheres to the plastic sheet tenaciously even when the base is repeatedly bent or creased and even when wet with water.

Thus the present process is advantageous for improving the anchorage of surface coatings to metals for example, automobile bodies, metal signs, utensils and conduits of metal, also for providing strongly adhering coatings on glass, for example, show windows, signs, bottles, partitions of glass, etc., also for improving the adhesion of coatings on various organic plastic materials such as wrapping sheets, formed containers, molded plastic objects of all kinds. In my co-pending U. S. application Serial No. 390,543 filed April 26, 1941, I disclose and claim plastic playing cards provided with coatings in accordance with the present invention.

By the present invention there has been provided a simple and economical method of improving the adhesion of coatings to non-fibrous plastic materials in general. The particles employed do not detract from the feel, appearance, or transparency of the coating and greatly improve the adhesion of the coating during wear and washing of the materials. While various changes may be made in the process and in the nature and application of the comminuted materials, the invention is not to be limited except as defined by the appended claims.

I claim:

1. In a process for improving the adhesion of film-forming coating compositions to non-fibrous plastics, the step comprising applying to the surface of the plastic an invisible deposit comprising a multiplicity of particles of a finely comminuted solid inorganic compound of a metal which forms molecular coordination complexes but does not combine chemically with the plastic or alter its chemical characteristics.

2. A process for the manufacture of coated non-fibrous plastic materials comprising applying to the surface of the plastic material an invisible deposit comprising a multiplicity of particles of a finely comminuted solid inorganic compound of a metal which forms molecular coordination complexes but does not combine chemically with the plastic or alter its chemical characteristics, and applying over said particles a coating of a film-forming composition.

3. In a process for the manufacture of coated non-fibrous plastic materials, the steps comprising dusting the surface of the non-fibrous plastic materials to deposit thereon a multiplicity of particles of a finely comminuted solid inorganic compound of a metal which forms molecular coordination complexes but does not combine chemically with the plastic or alter its chemical characteristics, substantially all of which particles are of a size less than 100 mesh and at least 50% thereof being less than 200 mesh, and applying over said particles a coating of a lacquer.

4. In a process for the manufacture of non-fibrous plastic materials, the steps comprising treating the plastic material with a suspension of a finely comminuted solid inorganic compound of a metal which forms molecular coordination complexes but does not combine chemically with the plastic or alter its chemical characteristics, in a liquid which is inert to said plastic material, evaporating said liquid to deposit on said material an invisible deposit comprising a multiplicity of particles of said comminuted material, and applying over said particles a coating of a film-forming composition.

5. An article of manufacture comprising a non-fibrous plastic base provided with a surface having distributed thereover particles of an inorganic compound of an element which forms molecular coordination complexes but does not combine chemically with the plastic or alter its chemical characteristics, said particles substantially all being of a size less than 80 mesh, and a film of coating material covering said surface and anchored thereto by the aid of said particles.

6. As an article of manufacture, a non-fibrous plastic material comprising a plastic material having on its surface an invisible deposit comprising a multiplicity of particles of finely comminuted solid inorganic compound of a metal which forms molecular coordination complexes but does not combine chemically with the plastic or alter its chemical characteristics, and a transparent coating over said particles, the particles serving to anchor said coating to said plastic material.

7. As an article of manufacture, a non-fibrous plastic material comprising a plastic material, a multiplicity of particles of a finely comminuted solid inorganic compound of a metal which forms molecular coordination complexes but does not combine chemically with the plastic or alter its chemical characteristics distributed over the surface of said plastic material, and a plurality of film-like coatings over said particles, the particles substantially all being of a size less than 80 mesh and serving to anchor said coatings to said plastic material.

8. As an article of manufacture, a non-fibrous plastic material comprising a printed plastic material having on its surface an invisible deposit comprising a multiplicity of particles of finely comminuted solid anhydrous inorganic compound of a metal which forms molecular coordination complexes but does not combine chemically with the plastic or alter its chemical characteristics, and a transparent coating over said particles, the particles serving to anchor said coating to said plastic material.

9. As an article of manufacture, a non-fibrous plastic material comprising a plastic material, a multiplicity of particles of a finely comminuted magnesium compound on the surface of said plastic material, and a film of coating material over said particles, the particles serving to anchor said coating to said plastic material.

FRANK J. SOWA.